(12) United States Patent
Nichols

(10) Patent No.: US 6,608,816 B1
(45) Date of Patent: Aug. 19, 2003

(54) METHOD AND APPARATUS FOR PROVIDING DIFFERENTIATED SERVICES USING A MULTI-LEVEL QUEUING MECHANISM

(75) Inventor: Kathleen M. Nichols, Woodside, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/195,573

(22) Filed: Nov. 18, 1998

(51) Int. Cl.[7] .............................................. H04L 12/56
(52) U.S. Cl. ...................................... 370/235; 370/429
(58) Field of Search ................................ 370/412, 395, 370/429, 230, 415; 709/235

(56) References Cited

U.S. PATENT DOCUMENTS

| | | | | |
|---|---|---|---|---|
| 5,754,529 A | | 5/1998 | Hiess | 370/232 |
| 5,996,019 A | * | 11/1999 | Hauser et al. | 709/235 |
| 6,137,807 A | * | 10/2000 | Rusu et al. | 370/429 |
| 6,205,150 B1 | * | 3/2001 | Ruszcyk | 370/412 |
| 2001/0009552 A1 | * | 7/2001 | Parruck et al. | 370/412 |
| 2001/0010692 A1 | * | 8/2001 | Sindhu et al. | 370/395 |

FOREIGN PATENT DOCUMENTS

EP  0 810 809 A2  12/1997  .................. 11/4

OTHER PUBLICATIONS

Reiss, L.K. and Merakos, L.F.; Shaping Of Virtual Path Traffic For ATM B–ISDN. *IEEE Infocom '93: The Conference On Computer Communications.* (Mar. 28, 1993). vol. 1, IEEE Computer Society Press.

* cited by examiner

*Primary Examiner*—Hassan Kizou
*Assistant Examiner*—Lu Yin
(74) *Attorney, Agent, or Firm*—Blakely Sokoloff Taylor & Zafman LLP (57) ABSTRACT

A method and apparatus for providing differentiated services using a multi-level queuing mechanism includes checking whether a packet of data is to receive a preferred level of service, and if the packet is not to receive the preferred level of service, then placing the packet in a first forwarding queue. However, if the packet of data is to receive the preferred level of service then checking whether it is permissible to forward the packet to a device in the network at the current time. If it is permissible to forward the packet to the device at the current time, then placing the packet in a second forwarding queue, otherwise temporarily placing the packet in a holding queue before placing the packet in the second forwarding queue.

21 Claims, 5 Drawing Sheets

METHOD AND APPARATUS FOR PROVIDING DIFFERENTIATED SERVICES USING A MULTI-LEVEL QUEUING MECHANISM

BACKGROUND OF THE INVENTION

1. Field of the Invention

The present invention pertains to routing data in a network. More particularly, this invention relates to providing differentiated services using a multi-level queuing mechanism.

2. Background

Computer systems are increasingly becoming commonplace in homes and businesses throughout the world, and are increasingly becoming interconnected via networks. As the number of interconnected computer systems in use increases, so too does the amount of data being transferred by the networks (also referred to as the network "traffic"). Typically, the speed at which data can be transferred over the network decreases as the amount of network traffic increases because more and more data is trying to be transferred over the same amount of network hardware. For some types of data (e.g., phone calls or video conferencing), it is important that the data not be delayed very much during transfer over the network, regardless of the amount of network traffic.

One solution to this network traffic problem that has been presented is the use of "differentiated services" schemes. Generally, the idea of differentiated services is that certain types of data receive preferential treatment over the network, causing it to be transferred over the network faster than other types of data. This preferential treatment can be obtained in a variety of manners, such as by paying a premium price. However, given the amount of data that is typically being transferred over devices in the network, any mechanism to implement differentiated services should operate relatively quickly so as not to impede the transfer of data. Furthermore, care should be taken to ensure that the data that is receiving preferential treatment does not exceed a preconfigured amount or rate (e.g., the amount or rate that has been paid for). Currently, there are no differentiated services implementations that provide quick and efficient handling of differentiated services data.

Thus, a need exists for an improved way to implement differentiated services.

SUMMARY OF THE INVENTION

A method and apparatus for providing differentiated services using a multi-level queuing mechanism is described herein. According to one aspect of the present invention, a method for providing differentiated services in a network includes checking whether a packet of data is to receive a preferred level of service, and if the packet is not to receive the preferred level of service, then placing the packet in a first forwarding queue. However, if the packet of data is to receive the preferred level of service then checking whether it is permissible to forward the packet to a device in the network at the current time. If it is permissible to forward the packet to the device at the current time, then placing the packet in a second forwarding queue, otherwise temporarily placing the packet in a holding queue before placing the packet in the second forwarding queue.

According to another aspect of the present invention, an apparatus for providing differentiated services in a network includes first and second forwarding queues for forwarding packets of data to another device in the network, and also includes a holding queue to temporarily store packets of data prior to being placed in the second forwarding queue. The apparatus further includes a policy meter to check whether a packet of data is to receive a preferred level of service, and, if the packet is not to receive the preferred level of service, then to place the packet in the first forwarding queue. However, if the packet of data is to receive the preferred level of service, then the policy meter checks whether it is permissible to forward the packet to the device at the current time. If it is permissible to forward the packet to the device at the current time, then the policy meter places the packet in the second forwarding queue, and otherwise places the packet in the holding queue.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide. interconnection between their subscribers and their networks such as loop systems, and which provide multiplexing, aggregation and transport between a service provider's switching systems across the wide area, and associated signaling and support systems and services.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention makes use of a multi-level queuing structure to provide differentiated services. Packets are forwarded into a network supporting differentiated services by using the multi-level queue structure. A first queue level is a set of forwarding queues into which packets are placed prior to being forwarded into the network. The amount of time a packet remains in the first queue level is dependent on the total number of packets in the first level as well as the rate at which the forwarding device is able to provide packets to the network. Additionally, packets that are to receive a premium service level may also be temporarily placed into a second level queue, referred to as a hold queue, prior to being placed in the first queue level. The present invention ensures that packets are transferred from the hold queue into a first level queue at not higher than a preconfigured rate, and thus that the rate of transfer of premium service level packets to the network does not exceed the preconfigured rate.

Figure 1:
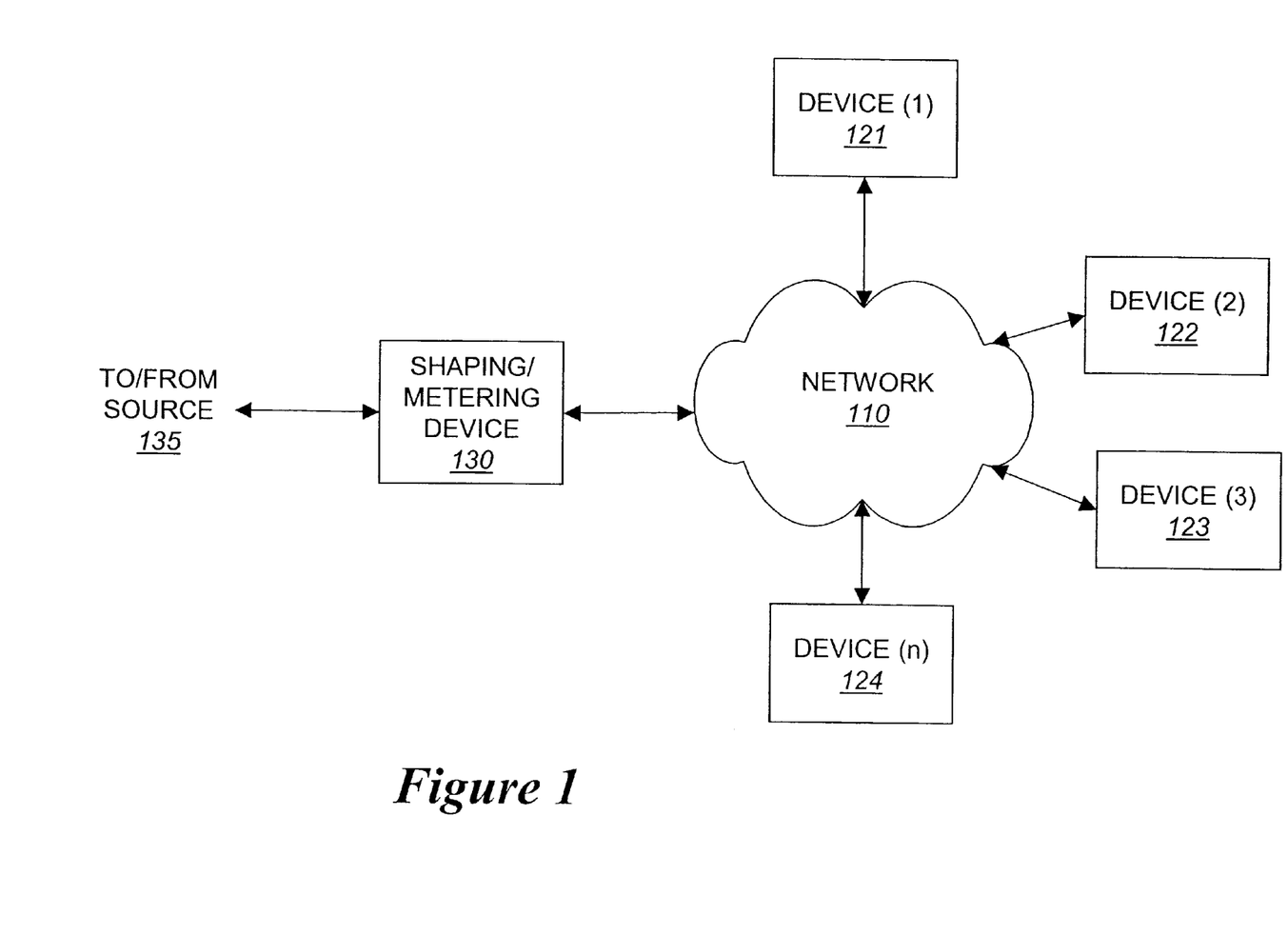
FIG. 1 illustrates a network environment into which one embodiment of the present invention can be incorporated.

FIG. 1 illustrates a network environment into which one embodiment of the present invention can be incorporated. A network 110 is illustrated interconnecting multiple devices 121, 122, 123, 124, and 130. Network 110 is intended to represent any of a wide variety of conventional networks, such as the Internet, an intranet, a local area network (LAN), a subset of a larger network (e.g., a portion of the Internet), etc. Devices 121–124 and 130 are intended to represent any of a wide variety of conventional devices that can receive data from and/or transfer data to network 110. Examples of such devices include "end points", such as workstations and servers, or connections to other networks, such as routers, bridges, gateways, etc.

Network 110 is configured to provide differentiated services to data packets. According to one embodiment of the present invention, the differentiated services include three different levels of service: best effort service, assured service, and premium service. Best effort service is the lowest level, guaranteeing only that the network will do its best to try and deliver packets of data to their destinations. Currently, many networks (such as the Internet) provide best effort service. Assured service is a higher level of service, ensuring that packets of data are unlikely to be dropped from the network so long as the amount of such data stays within a particular profile (e.g., not larger than a particular size or greater than a particular rate). Premium service is the highest level of service. Packets of data at the premium service level are given preferential treatment through the network, and are almost certain not to be dropped from the network so long as the amount of such data stays within a particular profile (e.g., premium packets are not sent at greater than a particular rate).

It is to be appreciated that network 110 includes multiple components, including any combination of routers, switches, bridges, gateways, workstations, servers, etc. to transfer packets of data. In order to support differentiated services, each of the components within network 110 needs to be able to identify and properly treat packets of different service levels. This can include, for example, the components giving priority to higher service level packets by forwarding them prior to any lower service level packets, or using dedicated paths or channels for higher priority packets. According to one embodiment of the present invention, each of the packets of data being transferred through the network includes a packet header that identifies the service level for the packet. Alternate embodiments can identify service levels in other manners, such as by separate signaling or use of dedicated input and output ports.

According to one embodiment of the present invention, packets of data to be sent using premium and assured service levels are required to conform to particular profiles. For the assured service level, the particular profile identifies a particular "expected capacity" (e.g., not greater than a particular rate, such as 100k bits per second, or a particular burst rate, such as four packets back-to-back). For the premium service level, the particular profile identifies a particular packet rate that will not be exceeded (e.g., not greater than twenty packets per minute).

Edge devices, such as shaping/metering device 130, operate to ensure that such profiles are not violated. By doing so at the edge devices at which data is being input to network 110, each component within network 110 is not required to verify that packets of data conform to the requirements for their identified level of service.

Thus, in the illustrated embodiment of FIG. 1, data is received by shaping/metering device 130 from a source 135. It is to be appreciated that source 135 can be an end point (e.g., a server or workstation), or alternatively a connection to another network (e.g., a bridge or gateway to a company's LAN). Upon receipt of a packet of data from source 135, device 130 analyzes the packet to ensure that the profiles are not being violated and forwards packets to network 110. If one of the profiles is being violated, then packets of data may be dropped or re-labeled to be forwarded to network 110 at a different service level. Packets that are dropped are simply ignored by device 130 and are not forwarded to network 110. The operation of device 130 in ensuring that profiles are not being violated is discussed in more detail below with reference to the following figures.

It should be noted that devices 121–124 may also provide metering and shaping functionality for packets of data received by the devices from other sources (not shown) to be provided to network 110, as well as for packets of data being forwarded to other destinations by the devices.

Figure 2:
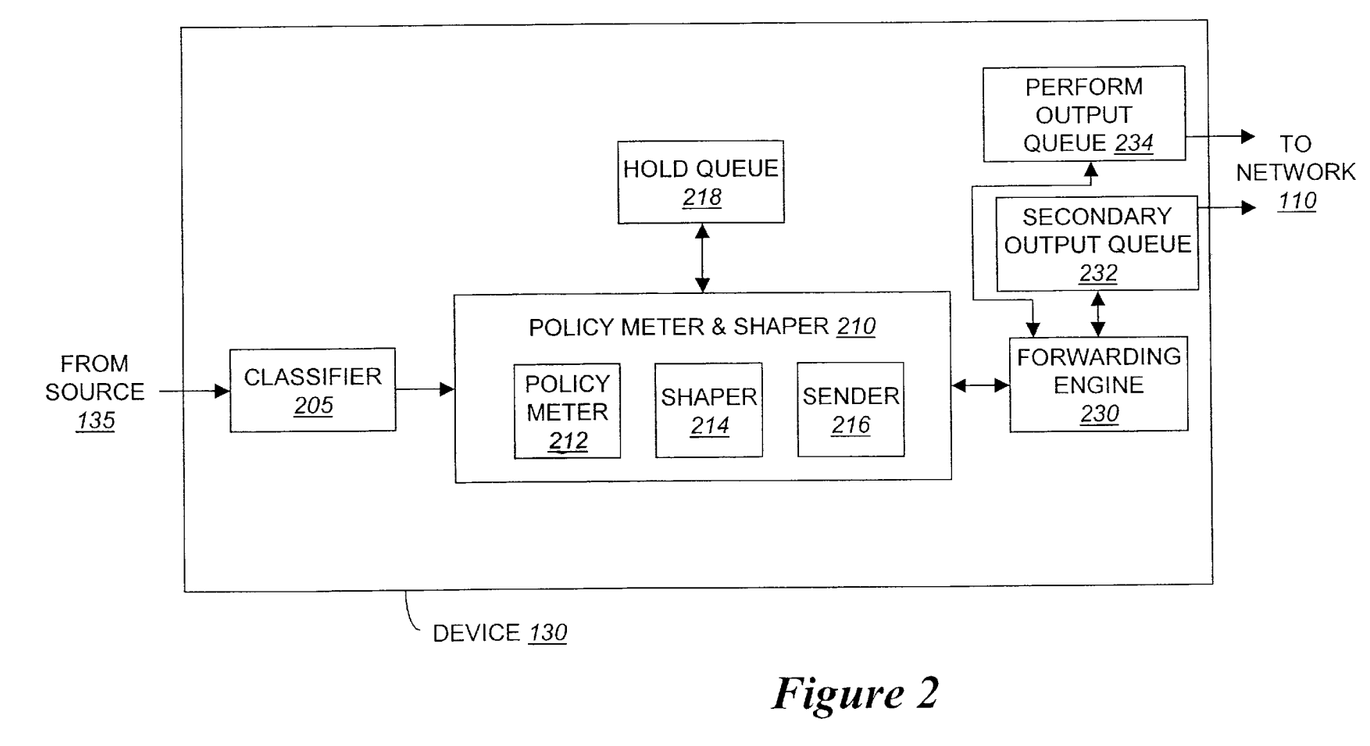
FIG. 2 is a diagram illustrating a metering and shaping device according to one embodiment of the present invention.

FIG. 2 is a diagram illustrating a metering and shaping device according to one embodiment of the present invention. In the discussion of FIG. 2 and subsequent figures, reference is made to the forwarding and/or transferring of packets by different logic units of device 130. According to one embodiment of the present invention, device 130 includes a data buffer (not shown) having multiple locations for the storage of data packets. When a data packet is received by device 130, the data is stored in a location of the buffer and remains in that location until the data is forwarded out of device 130 to network 110. The discussion of "movement" of such packets within device 130 in this embodiment refers to the transferring or forwarding of packet "pointers" which identify the locations of the buffer. However, according to alternate embodiments of the present invention, the actual data itself may be transferred or forwarded between multiple buffers (not shown) within device 130.

As illustrated in FIG. 2, data packets are received by device 130 from source 135. Device 130 is capable of handling multiple "flows". A flow refers to a particular input port to output port mapping of device 130. According to one embodiment, each flow is identified by a set of identifying information in the packet header, including the Internet Protocol (IP) source address, IP destination address, source port, destination port, and protocol identifier. These five pieces of information are also collectively referred to as a "5-tuple". A packet of data received by device 130 is input to classifier 205. Classifier 205 compares a set of preprogrammed 5-tuples (which can include "wildcards") to the received 5-tuple for the packet and outputs an identifier of a particular flow for the packet. The number of flows within a device, such as a router, is typically on the order of 30 to 50. However, it is to be appreciated that fewer or greater flows could be included within a device. The use of classifiers and flows within devices is well known to those skilled in the art and thus will not be discussed further except as it pertains to the present invention.

The identifier output from classifier 205 identifies a particular shaper/policy meter to which the packet is forwarded, as well as ultimately a set of forwarding queues and a forwarding engine. For ease of explanation, only a single shaper/policy meter 210 and forwarding engine 230 are illustrated in FIG. 2. It is to be appreciated, however, that a different shaper/policy meter and forwarding engine (as well as holding queue and forwarding queues) can be included for each of the different flows supported by device 130. Although, it is also to be appreciated that in embodiments where shaper/policy meter 210 are implemented in software, various procedures and sections of software code can be shared by different flows.

The packet is then provided to policy meter and shaper 210. Shaper/meter 210 accesses the service type information in the packet header (typically provided by the original source) to determine whether the packet is to receive a preferred level of service. Based on the level of service the packet is to receive, as well as when previous packets of data have been forwarded by device 130, shaper/meter 210 either forwards the packet to shaper 214 for temporary storage in hold queue 218 or to forwarding engine 230.

Shaper/meter 210 is responsible for ensuring that the configured policies for different levels of service are maintained. By way of example, if the owner of a particular source has contracted with the owner of device 130 that the source will not attempt to send greater than x number of premium level packets per minute to device 130 for forwarding to network 110, shaper/meter 210 ensures that this "contracted for" rate is not exceeded. In fact, according to one embodiment of the present invention if the contracted for rate is exceeded then some of the premium level packets may be dropped.

Eventually, packets that are not dropped are forwarded to one of the output queues 232 or 234. The packets are then forwarded on to network 110 from queues 232 and 234 by forwarding engine 230. Packets of data at the premium service level are placed in premium output queue 234, while the packets at the assured or best effort service levels are placed in secondary output queue 232. Forwarding engine 230 controls the forwarding of packets to network 110, with priority being given to packets in premium output queue 234.

According to one embodiment of the present invention, forwarding a packet of data to one of the output queues 232 or 234 is accomplished by sending the packet to forwarding engine 230. The placement of the packet into the proper one of queues 232 and 234, as well as the proper location within that queue, is performed by forwarding engine 230. Forwarding engine 230 may determine the proper one of queues 232 and 234 based on service level information contained in the header of the data packet, or alternatively from parameters received from shaper/meter 210 when the packet is transferred to forwarding engine 230. According to one embodiment of the present invention, each of queues 232 and 234 is a conventional first-in first-out (FIFO) queue.

Forwarding engine 230 can use any of a wide variety of conventional arbitration algorithms for selecting packets from queues 232 and 234 for output to network 110. Examples of such algorithms include giving any packet in premium output queue 234 priority over any packet in secondary output queue 232, and a weighted round robin scheme that favors output queue 234. In the illustrated embodiment, forwarding engine 230 outputs data to network 110 at its fastest possible speed, which is dependent on the physical connection between device 130 and network 110.

According to one embodiment of the present invention, classifier 205, shaper/meter 210, and forwarding engine 230 are implemented in software. In this embodiment, software instructions to carry out the processes of classifier 205, shaper/meter 210, and forwarding engine 230 are stored in a system memory (not shown) of device 130 of FIG. 2 and executed by a processor (not shown) of device 130. According to one alternate embodiment of the present invention, classifier 205, shaper/meter 210, and forwarding engine 230 are implemented in firmware, such as a ROM or Flash memory of the device 130. According to another alternate embodiment of the present invention, classifier 205, shaper/meter 210, and forwarding engine 230 are implemented in hardware, such as an application specific integrated circuit (ASIC) of device 130.

In the discussion to follow, reference is made to various times, such as "the current time". In the illustrated embodiment, time is referenced to a clock that "ticks" at a particular "tick time". The tick time is a value (e.g., in microseconds) that is calculated by dividing the minimum data packet size (64 bytes according to one implementation) by the maximum output line rate for device 130 (10 Megabits per second or 100 Megabits per second according to one implementation).

Figure 3:
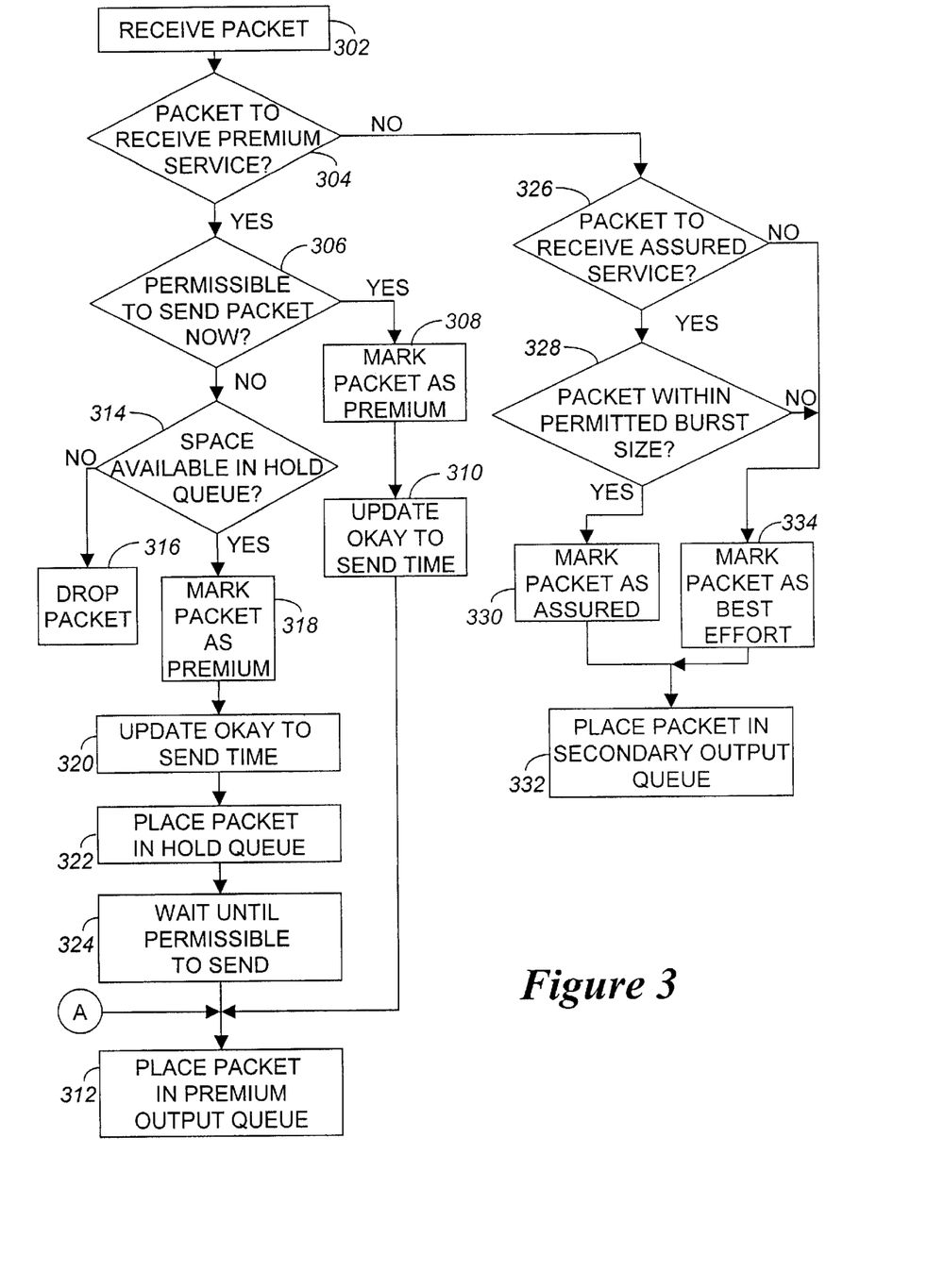
FIG. 3 is a flowchart illustrating the steps followed by a policy meter and shaper according to one embodiment of the present invention.

FIG. 3 is a flowchart illustrating the steps followed by a policy meter and shaper according to one embodiment of the present invention. Shaper/meter 210 of FIG. 2 first receives a packet of data (e.g., from classifier 205), step 302. Upon receipt of the packet, policy meter 212 checks whether the packet is to receive premium service, step 304. As discussed above, the packet header identifies the type of service the packet is to receive, so policy meter 212 can make this determination based on the packet header information.

If the packet is to receive premium service, then policy meter 212 checks whether it is permissible to send the packet at the present time, step 306. In the illustrated embodiment, policy meter 212 maintains a record of when it is permissible to send the next packet, referred to as the "okay to send" value or time. The okay to send time is updated each time policy meter 212 forwards a newly received premium service packet to either premium output queue 234 or holding queue 218. In step 306, policy meter 212 compares the current time to the okay to send time and determines that it is permissible to send the packet at the current time if the current time is greater than or equal to the okay to send time.

If it is permissible to send the packet at the current time, then policy meter 212 marks the packet as "premium service", step 308. This marking is, according to one embodiment of the present invention, a predetermined bit pattern in the packet header that is expected by the components of network 110 to identify premium service packets. Alternatively, the type of service information in the header that was originally provided to device 130 from the source 135 could be used by the components of network 110, and the marking step not performed.

Policy meter 212 then updates the okay to send time, step 310. The okay to send time is updated to be the current time plus the amount of time necessary to send the packet from the premium output queue 234 to network 110. It should be noted that this amount of time necessary to send the packet is the amount of time necessary to send the packet to network 110 at the "contracted for" rate, which may be longer than the actual time necessary to send the packet to network 110. By way of example, the connection to network 110 may be fast enough to support 50 packets per second, although the contracted for rate is 10 packets per second. Thus, the amount of time necessary to send the packet would be 0.1 seconds (1÷10) rather than 0.02 seconds (1÷50).

In the illustrated embodiment, the amount of time necessary to send the packet from the premium output queue 234 to network 110 is determined based on the actual size of the packet of data (e.g., number of bytes), including any header and/or tail information. According to one embodiment of the present invention, a lookup table is used that includes both the packet size and a corresponding amount of time. This lookup table can be pre-computed, based on the known clock rate-being used by policy meter 212 as well as the output transfer rate of device 130 and the contracted for rate. In one implementation, the lookup table includes a different entry for each possible packet size. According to an alternate implementation, ranges of packet sizes are used (e.g., less than 100 bytes, between 100 and 200 bytes, between 200 and 400 bytes, etc.).

After updating the okay to send value, policy meter 212 places the packet into the premium output queue 234, step 312. At this point, forwarding engine 230 is responsible for forwarding the packet to network 110.

Returning to step 306, if it is not permissible to send the packet at the current time, policy meter 212 checks whether there is sufficient space in hold queue 218 to store an additional packet of data, step 314. According to one implementation, the determination of whether there is sufficient space in hold queue 218 is made based on a maximum amount of time into the future that a packet will be held by shaper/meter 210 for placing into the forwarding queue. Policy meter 212 compares the current okay to send time minus the current time to the maximum amount of time into the future that a packet will be held for placing into the forwarding queue. If the current okay to send value minus the current time exceeds the maximum amount of time, then there is insufficient space in hold queue 218. Otherwise, there is sufficient space in hold queue 218.

If policy meter 212 determines that there is insufficient space in hold queue 218, then policy meter 212 drops the data packet, step 316. In other words, the data packet is ignored by device 130 and is not forwarded to network 110. According to an alternate embodiment, rather than dropping the packet, policy meter 212 re-marks the packet (e.g., as best effort, step 334 discussed below), and forwards the packet to network 110 with the new marking.

However, if policy meter 212 determines that there is sufficient space in hold queue 218, then policy meter 212 marks the packet as "premium service", step 318, analogous to step 308 discussed above. Policy meter 212 then updates the okay to send time, step 320. The okay to send time is updated to be the current okay to send time plus the amount of time necessary to send the packet from the premium output queue 234 to network 110. It should be noted that, analogous to the discussion above, this amount of time necessary to send the packet is the amount of time necessary to send the packet to network 110 at the "contracted for" rate, not necessarily the actual time necessary to send the packet to network 110.

The packet is then placed in the hold queue, step 322. Policy meter 212 forwards the packet as well as the current okay to send time to shaper 214, which in turn places the packet into the hold queue.

Figure 4:
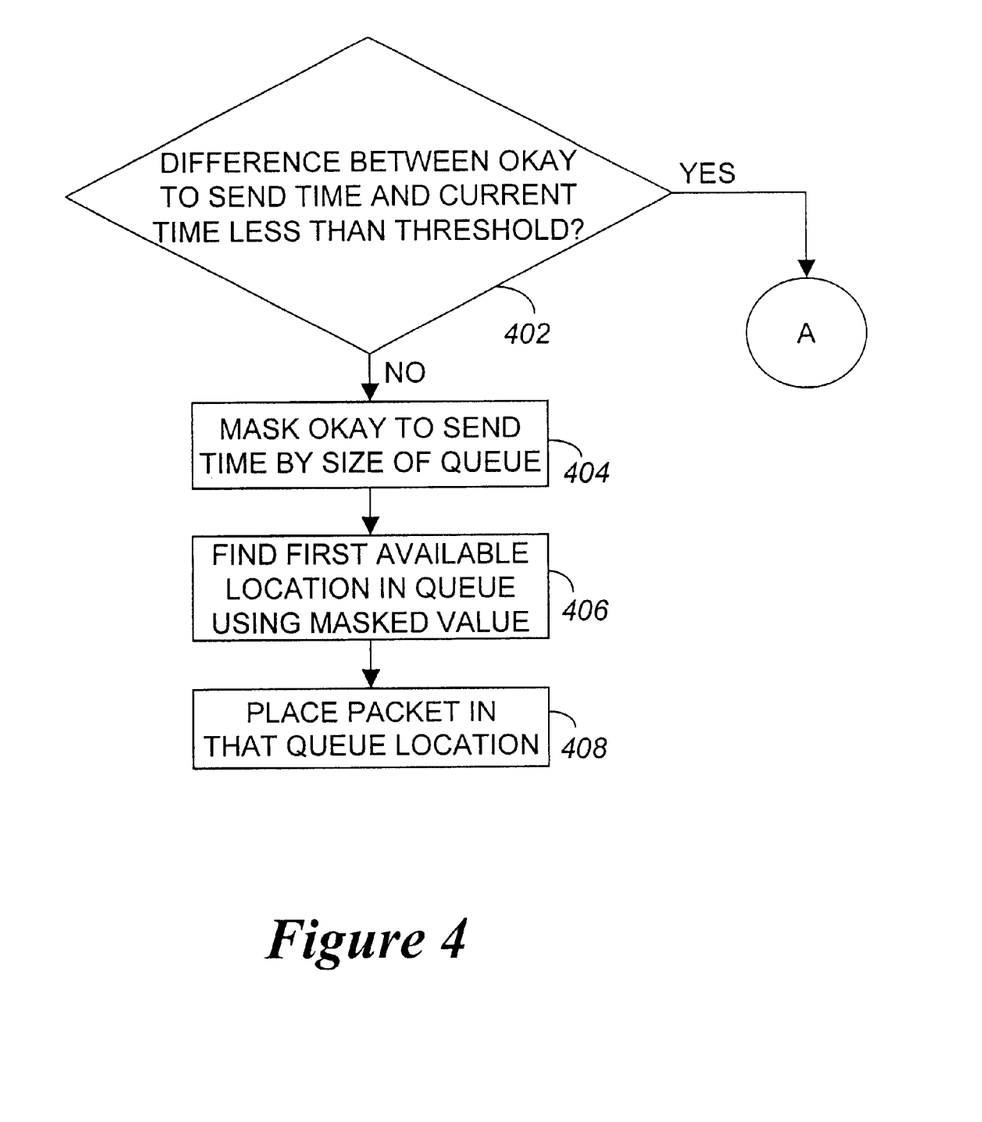
FIG. 4 is a flowchart illustrating the steps followed by a shaper in placing a packet into the hold queue according to one embodiment of the present invention.

FIG. 4 is a flowchart illustrating the steps followed by shaper 214 in placing a packet into the hold queue according to one embodiment of the present invention. Shaper 214 first checks whether the difference between the okay to send time and the current time is less than a threshold amount, step 402. If the difference is less than the threshold amount, then shaper 214 places the packet in premium output queue 234, step 312 of FIG. 3. In one implementation, this threshold amount is on the order of 10–12 clock ticks. This comparison to a threshold amount is made to prevent shaper 214 from expending the time to place a packet into the hold queue if it is going to be forwarded out of the queue very quickly anyway. If the difference in step 402, however, is not less than the threshold amount, then shaper 214 masks the okay to send time by the size of the queue, step 404. This masking generates a pointer into the hold queue based on the okay to send time.

Figure 5:
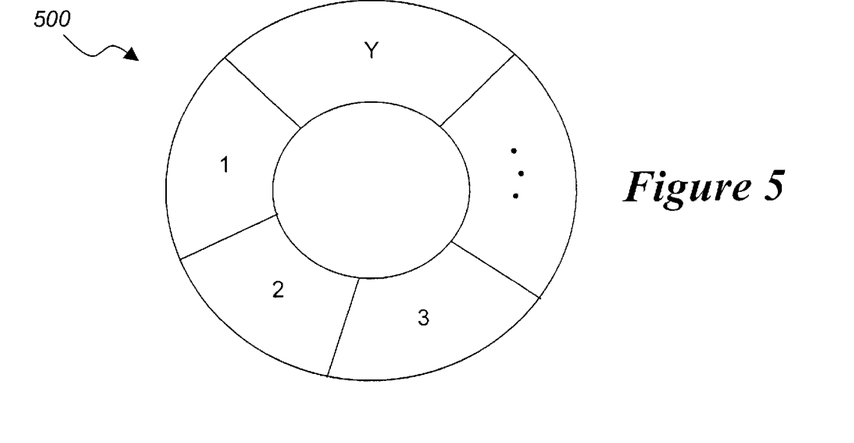
FIG. 5 is a block diagram illustrating an example holding queue according to one embodiment of the present invention.

FIG. 5 is a block diagram illustrating an example holding queue according to one embodiment of the present invention. As illustrated, holding queue 500 is a "circular" queue having storage capacity for y packets of data. The masking of the okay to send time by the size of the queue causes the pointer to wrap around queue 500.

Returning to FIG. 4, shaper 214 finds the first available location in the holding queue using the pointer (from step 404), step 406. According to one implementation, the first available location is found by first accessing the queue location identified by the pointer generated in step 404. If that queue location is available (that is, no other packets are currently being stored there), then the finding process is complete. Otherwise, the pointer is incremented by one and the newly pointed to queue location is checked for availability. If the newly pointed to queue location is available, then the finding process is complete, otherwise the incrementing and checking continues until an available location is found. It is to be appreciated that, because the determination was made in step 314 of FIG. 3 that there is sufficient space in the hold queue, eventually an available location will be found in step 406.

Upon finding the first available location within the queue, shaper 214 places the packet into that queue location, step 408.

According to one alternate embodiment of the present invention, shaper 214 does not perform step 402. In this alternate embodiment, shaper 214 always places packets into holding queue 218 without regard for the difference between the okay to send time and the current time. According to another alternate embodiment of the present invention, different processes are used to find an available location in holding queue 218. By way of example, different starting locations can be used for starting the search for the first available queue location, or different incrementation values can be used.

Returning to FIG. 3, once the packet is placed in the hold queue, shaper/meter 210 waits until it is permissible to send the packet to network 110, step 324. Once it is okay to send the packet, sender 216 of FIG. 2 places the packet into premium output queue 234, step 312.

Figure 6:
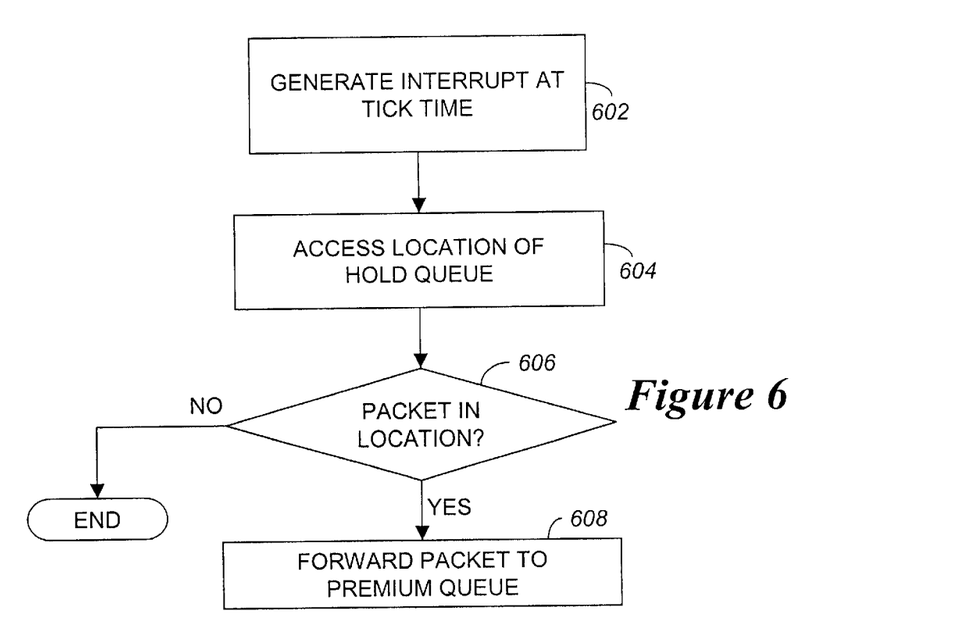
FIG. 6 is a flowchart illustrating the steps followed in forwarding packets from a holding queue to a premium output queue according to one embodiment of the present invention.

FIG. 6 is a flowchart illustrating the steps followed in forwarding packets from holding queue 218 to premium output queue 234 according to one embodiment of the present invention. An interrupt is generated every tick time, step 602, by a component (not shown) of the system in which the present invention is embodied. In response to the interrupt, sender 216 accesses the current location of hold queue 218, step 604. Sender 216 maintains a pointer into hold queue 218 that is incremented by one in response to each interrupt, continually wrapping around the queue. Sender 216 checks whether there is a packet in the current location of hold queue 218, step 606. If there is a packet, then sender 216 forwards the packet to premium output queue 234, step 608. Otherwise, the process simply ends, and then repeats at the next interrupt.

Returning to step 304 of FIG. 3, if the packet is not to receive premium service, then policy meter 212 checks whether the packet is to receive assured service, step 326. As discussed above, the packet header identifies the type of service the packet is to receive, so policy meter 212 can make this determination based on the packet header information. If the packet is to receive assured service, then policy meter 212 checks whether the packet size is within a permitted burst size, step 328. The permitted burst size is a preconfigured maximum size or rate which packets at the assured service level are not to exceed. Typical values for the permitted burst size are on the order of two to four packets. According to one implementation, policy meter 212 maintains a count of packets received at the assured level of service. This count is reset to zero each time a packet of other than the assured service level is received, thereby allowing policy meter 212 to know when the permitted burst size has been exceeded.

If the packet is within the permitted burst size, then policy meter 212 marks the packet as "assured service", step 330. Analogous to the premium service marking discussed above with reference to step 308, the assured service marking is a predetermined bit pattern in the packet header that is expected by the components of network 110 to identify assured service packets. Policy meter 212 then places the packet into the secondary output queue 232, step 332. At this point, forwarding engine 230 is responsible for forwarding the packet to network 110.

Returning to steps 326 and 328, if policy meter 212 determines that the packet is not to receive assured service (step 326), or that the packet is not within the permitted burst size (step 328), then policy meter 212 marks the packet as "best effort service", step 334. Analogous to the premium service marking discussed above with reference to step 308, the best effort service marking is a predetermined bit pattern in the packet header that is expected by the components of network 110 to identify best effort service packets. Policy meter 212 then places the packet into the secondary output queue 232, step 332. At this point, forwarding engine 230 is responsible for forwarding the packet to network 110.

In the discussions above, reference is made to various specific units of measurement (e.g., numbers of bytes). Alternate embodiments of the present invention can be based on different units either smaller or larger than the specific units discussed above (e.g., bits or multiple-byte words).

Also in the discussions above, reference is made to three levels of service (premium, assured, and best effort). It is to be appreciated that the present invention is not limited to the use of only three levels of service, and that greater or fewer levels could be implemented. By way of example, the assured level of service need not be included, or additional levels of "preferential" service may be added. It is also to be appreciated that additional holding queues and/or forwarding queues can be added to accommodate such additional levels of service.

Also in the discussions above, reference is made to device 130 of FIG. 2 including multiple shaper/meters 210, one for each flow through device 130. In alternate embodiments, a single shaper/meter 210 may be used to control multiple flows through device 130.

Also in the discussions above, reference is made to multiple forwarding queues 232 and 234. Alternatively, a single queue could be used with additional control logic in forwarding engine 230 to distinguish between premium and non-premium packets within the single queue. Similarly, rather than having individual forwarding queues 232 and 234 for each flow, a single queue structure could be used with multiple flows, with additional control logic in forwarding engine 230 to distinguish between the different flows.

Also in the discussions above, reference is made to packets being dropped under certain circumstances. For example, if a packet is to receive premium service and the holding queue is full (as discussed with reference to FIG. 3). According to alternate embodiments, such packets may be re-classified (e.g., to best effort service) rather than being dropped. Similarly, reference is made to packets being re-classified in certain under certain circumstances (e.g., a packet to receive assured service is not within a permitted burst size). According to alternate embodiments, such packets may be dropped rather than re-classified.

Therefore, a method and apparatus for providing differentiated services using a multi-level queuing mechanism has been described. Packets of data that are to receive a premium level of service can be temporarily stored in a holding queue prior to being placed in a forwarding queue and subsequently transferred over the network. The temporary storage of the packets allows the device to ensure that a particular transfer rate of premium packets is not exceeded. Furthermore, the placement of premium level packets into the holding queue, and thus the determination of when it is okay to send the packets, is done in a quick manner employing simple addition.

Thus, a method and apparatus for providing differentiated services using a multi-level queuing mechanism has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method of providing differentiated services in a network, the method comprising:
    checking whether a packet of data is to receive a preferred level of service; and
    if the packet is not to receive the preferred level of service, then placing the packet in a first forwarding queue, otherwise,
        checking whether it is permissible to forward the packet to a device in the network at the current time, and
        if it is permissible to forward the packet to the device at the current time, then placing the packet in a second forwarding queue, otherwise checking whether there is sufficient space in the holding queue for the packet and temporarily placing the packet in a holding queue if there is sufficient space in the holding queue before placing the packet in the second forwarding queue, otherwise dropping the packet.

2. The method of claim 1, further comprising:
    forwarding packets of data to the device in the network from the first forwarding queue and the second forwarding queue, giving priority to packets of data in the second forwarding queue.

3. The method of claim 1, further comprising:
    indexing into the holding queue based on the time at which the indexing occurs; and
    placing a packet at the indexed location of the holding queue into the second forwarding queue.

4. A method of providing differentiated services in a network, the method comprising:
    checking whether a packet of data is to receive a preferred level of service;
    if the packet is not to receive the preferred level of service, then placing the packet in a first forwarding queue, otherwise,
        checking whether it is permissible to forward the packet to a device in the network at the current time, and
        if it is permissible to forward the packet to the device at the current time, then placing the packet in a second forwarding queue, otherwise temporarily placing the packet in a holding queue before placing the packet in the second forwarding queue;
    updating an indicator of when it is okay to forward a next packet of data to the device; and
    using, upon receipt of the next packet of data, the indicator to determine whether it is permissible to forward the next packet of data to the device at the current time.

5. The method of claim 4, wherein the updating the indicator comprises:
    adding together the current time and an amount of time required to send the packet of data to the device.

6. An apparatus for providing differentiated services in a network, the apparatus comprising:
    a first forwarding queue for forwarding packets of data to another device in the network;
    a second forwarding queue for forwarding packets of data to another device in the network;
    a holding queue to temporarily store packets of data prior to being placed in the second forwarding queue; and
    a policy meter, coupled to the first and second forwarding queues and to the holding queue, to check whether a packet of data is to receive a preferred level of service, and, if the packet is not to receive the preferred level of service, then to place the packet in the first forwarding queue, otherwise,
        to check whether it is permissible to forward the packet to the device at the current time, and
        if it is permissible to forward the packet to the device at the current time, then to place the packet in the second forwarding queue, otherwise to check, prior to placing the packet in a holding queue, whether there is sufficient space in the holding queue for the packet and to place the packet in the holding queue if there is sufficient space in the holding queue or drop the packet if there is not sufficient space in the holding queue.

7. The apparatus of claim 6, further comprising:
    a forwarding engine, coupled to the first and second forwarding queues, to forward packets of data to the device in the network from the first forwarding queue and the second forwarding queue, giving priority to packets of data in the second forwarding queue.

8. The apparatus of claim 6, further comprising:
    send control logic to index into the holding queue based on the time at which the indexing occurs, and to place a packet at the indexed location of the holding queue into the second forwarding queue.

9. An apparatus for providing differentiated services in a network, the apparatus comprising:
    a first forwarding queue for forwarding packets of data to another device in the network;
    a second forwarding queue for forwarding packets of data to another device in the network;
    a holding queue to temporarily store packets of data prior to being placed in the second forwarding queue; and
    a policy meter, coupled to the first and second forwarding queues and to the holding queue, to check whether a packet of data is to receive a preferred level of service, and, if the packet is not to receive the preferred level of service, then to place the packet in the first forwarding queue, otherwise,
        to check whether it is permissible to forward the packet to the device at the current time,
        if it is permissible to forward the packet to the device at the current time, then to place the packet in the second forwarding queue, otherwise to place the packet in the holding queue,
    update an indicator of when it is okay to forward a next packet of data to the device, and
    use, upon receipt of the next packet of data, the indicator to determine whether it is permissible to forward the next packet of data to the device at the current time.

10. The apparatus of claim 9, wherein the policy meter is to update the indicator by adding together the current time and an amount of time required to send the packet of data to the device.

11. An apparatus for providing differentiated services in a network, the apparatus comprising:
  first means for forwarding packets of data to another device in the network;
  second means for forwarding packets of data to another device in the network;
  means for temporarily storing packets of data prior to being provided to the second means for forwarding;
  metering means, coupled to the first and second means and the means for temporarily storing packets, for checking whether a packet of data is to receive a preferred level of service, and, if the packet is not to receive the preferred level of service, then for providing the packet to the first means for forwarding packets of data, otherwise,
    for checking whether it is permissible to forward the packet to the device at the current time, and
    if it is permissible to forward the packet to the device at the current time, then for providing the packet to the second means for forwarding packets of data, otherwise for providing the packet to the means for temporarily storing packets; and
  sending means for indexing into the means for temporarily storing packets based on the time at which the indexing occurs, and for providing a packet at the indexed location of the means for temporarily storing packets to the second means.

12. The apparatus of claim 11, further comprising:
  means, coupled to the first and second means, for forwarding packets of data to the device in the network from the first and second means, giving priority to packets of data from the second means.

13. A machine-readable medium having stored thereon a plurality of instructions, designed to be executed by a processor, for providing differentiated services in a network by implementing a function to:
  check whether a packet of data is to receive a preferred level of service; and
  if the packet is not to receive the preferred level of service, then place the packet in a first forwarding queue, otherwise,
    check whether it is permissible to forward the packet to a device in the network at the current time, and
    if it is permissible to forward the packet to the device at the current time, then place the packet in a second forwarding queue, otherwise check whether there is sufficient space in the holding queue for the packet and either (i) place the packet in the holding queue if there is sufficient space in the holding queue before placing the packet in the second forwarding queue, or (ii) drop the packet if there is not sufficient space in the holding queue.

14. The machine-readable medium of claim 13, wherein the plurality of instructions are further for implementing a function to forward packets of data to the device in the network from the first forwarding queue and the second forwarding queue, giving priority to packets of data in the second forwarding queue.

15. The machine-readable medium of claim 13, wherein the plurality of instructions are further for implementing a function to:
  index into the holding queue based on the time at which the indexing occurs; and
  place a packet at the indexed location of the holding queue into the second forwarding queue.

16. The machine-readable medium of claim 13, wherein the plurality of instructions are further for implementing a function to:
  update an indicator of when it is okay to forward a next packet of data to the device; and
  use, upon receipt of the next packet of data, the indicator to determine whether it is permissible to forward the next packet of data to the device at the current time.

17. The machine-readable medium of claim 16, wherein the plurality of instructions to update the indicator include instructions to add together the current time and an amount of time required to send the packet of data to the device.

18. A method of providing differentiated services in a network, the method comprising:
  determining whether a packet of data is to receive a preferred level of service;
  placing the packet in a first forwarding queue if the packet is not to receive the preferred level of service;
  placing the packet in a second forwarding queue if the packet is to receive the preferred level of service and the packet is to be forwarded to a device in the network at a current time;
  determining whether there is sufficient space in the holding queue for the packet, prior to placing the packet in the holding queue;
  temporarily placing the packet in the holding queue if the packet is to receive the preferred level of service, the packet is not to be forwarded to the device in the network at the current time, and the holding queue has sufficient space for the packet; and
  dropping the packet if the packet is to receive the preferred level of service, the packet is not to be forwarded to the device in the network at the current time, and the holding queue fails to have sufficient space for the packet.

19. A method of providing differentiated services in a network, the method comprising:
  determining whether a packet of data is to receive a preferred level of service;
  placing the packet in a first forwarding queue if the packet is not to receive the preferred level of service;
  placing the packet in a second forwarding queue if the packet is to receive the preferred level of service and the packet is to be forwarded to a device in the network at a current time;
  temporarily placing the packet in a holding queue before placing the packet in the second forwarding queue if the packet is to receive the preferred level of service and the packet is not to be forwarded to the device in the network at the current time;
  updating an indicator of when it is acceptable to forward a next packet of data to the device; and
  using, upon receipt of the next packet of data, the indicator to determine whether it is permissible to forward the next packet of data to the device at the current time.

20. The method of claim 19, wherein the updating of the indicator comprises:
  adding together the current time and an amount of time required to send the packet of data to the device.

21. An apparatus for providing differentiated services in a network, the apparatus comprising:
  a first forwarding queue;
  a second forwarding queue;
  a holding queue to temporarily store packets of data prior to being placed in the second forwarding queue; and
  a policy meter coupled to the first forwarding queue, the second forwarding queue and the holding queue, the policy meter to coordinate placement of a packet of data (i) within the first forwarding queue if the packet of data is not to receive a preferred level of service, (ii) within the second forwarding queue if the packet of data is to receive the preferred level of service and it is permissible to forward the packet of data to a device of the network at a current time, (iii) within the holding queue if the packet of data is to receive the preferred level of service, it is not permissible to forward the packet of data to the device at the current time and the holding queue is able to store the packet of data, and (iv) dropping the packet of data if the packet of data is to receive the preferred level of service, it is not permissible to forward the packet of data to the device at the current time and the holding queue is unable to store the packet of data.

* * * * *